(12) United States Patent
Kanno

(10) Patent No.: US 8,486,254 B2
(45) Date of Patent: Jul. 16, 2013

(54) WASHING APPARATUS AND METHOD OF DEODORIZING WASHING WATER

(76) Inventor: Minoru Kanno, Sendai (JP)

( * ) Notice: Subject to any disclaimer, the term of this patent is extended or adjusted under 35 U.S.C. 154(b) by 205 days.

(21) Appl. No.: 13/141,577

(22) PCT Filed: Jan. 13, 2010

(86) PCT No.: PCT/JP2010/050294
§ 371 (c)(1),
(2), (4) Date: Jun. 22, 2011

(87) PCT Pub. No.: WO2010/100962
PCT Pub. Date: Sep. 10, 2010

(65) Prior Publication Data
US 2011/0253549 A1 Oct. 20, 2011

(30) Foreign Application Priority Data
Mar. 5, 2009 (JP) .................. 2009-052445

(51) Int. Cl.
*C02F 1/461* (2006.01)
*B08B 3/04* (2006.01)
*A61L 9/14* (2006.01)
*A61L 2/18* (2006.01)
*C25B 1/26* (2006.01)
*C25B 15/08* (2006.01)

(52) U.S. Cl.
USPC ............... 205/746; 204/263; 134/99.1; 422/5

(58) Field of Classification Search
None
See application file for complete search history.

(56) References Cited

U.S. PATENT DOCUMENTS

| 6,116,858 | A | 9/2000 | Narabayashi | |
|---|---|---|---|---|
| 2001/0042561 | A1* | 11/2001 | Kaketani et al. | .......... 134/169 R |
| 2003/0145893 | A1 | 8/2003 | Kweon | |

(Continued)

FOREIGN PATENT DOCUMENTS

| EP | 0 829 311 A2 | 3/1998 |
|---|---|---|
| JP | U-07-031189 | 6/1995 |

(Continued)

OTHER PUBLICATIONS

International Search Report issued in International Patent Application No. PCT/JP2010/050294 dated Feb. 16, 2010 (with translation).

(Continued)

*Primary Examiner* — Harry D Wilkins, III
(74) *Attorney, Agent, or Firm* — Oliff & Berridge, PLC

(57) ABSTRACT

A washing apparatus and a method of deodorizing washing water that can prevent the unpleasant smell of washing water are provided.

An electrolytic water producing means 2 produces strong acidic water and strong alkaline water by electrolysis of an electrolytic solution. The produced strong acidic water and strong alkaline water are stored in an acid container 3 and alkali container 4, respectively. A mist container 5 connected to the alkali container 4 produces a deodorant mist upon receiving a part of the strong alkaline water in the alkali container 4. A discharge port 6a is selectively connected to the acid container 3, alkali container 4, or water pipe 8 so as to discharge the strong acidic water, strong alkaline water, or tap water. A mist ejection portion 7 is formed to spray the deodorant mist of the strong alkaline water in the mist container 5 around the strong acidic water or tap water discharged from the discharge port 6a so that the mist surrounds the strong acidic water or tap water.

4 Claims, 2 Drawing Sheets

U.S. PATENT DOCUMENTS

2006/0260954 A1* 11/2006 Sano et al. .................. 205/742
2007/0186368 A1* 8/2007 Field et al. .................. 15/320
2007/0187263 A1 8/2007 Field et al.

FOREIGN PATENT DOCUMENTS

| JP | A-10-085634 | 4/1998 |
| JP | A-2000-079392 | 3/2000 |
| JP | A-2003-199547 | 7/2003 |
| JP | A-2003-265400 | 9/2003 |
| JP | A-2003-320278 | 11/2003 |
| JP | A-2005-007102 | 1/2005 |
| JP | A-2008-212334 | 9/2008 |

OTHER PUBLICATIONS

Apr. 3, 2013 Search Report issued in European Patent Application No. 10748560.9.

* cited by examiner (a)

(b)

(c)

WASHING APPARATUS AND METHOD OF DEODORIZING WASHING WATER

TECHNICAL FIELD

The present invention relates to a washing apparatus and a method of deodorizing washing water.

BACKGROUND ART

Conventionally, strong acidic water is utilized as washing water for sterilization or disinfection in hand washing face washing, dish washing, washing of medical equipment, etc. (for example, see PTL 1). Strong acidic water can be obtained by electrolysis of an electrolytic solution, such as water, and it is generally produced by electrolysis of an aqueous chloride salt solution, which uses sodium chloride etc. as an electrolyte.

CITATION LIST

Patent Literature
[PTL 1] Japanese Unexamined Utility Model No. 1995-31189

SUMMARY OF INVENTION

Technical Problem

Since the strong acidic water produced by electrolysis of an aqueous chloride salt solution contains chlorine, the strong acidic water generator disclosed in PTL 1 has a problem that unpleasant chlorine smell is produced while in use.

Focusing on this problem, the present invention was made, and an object of the invention is to provide a washing apparatus and a method of deodorizing washing water that can prevent the unpleasant smell of washing water.

Solution to Problem

In order to achieve the above object, the washing apparatus of the present invention is characterized by comprising an electrolytic water producing means that produces acidic water and alkaline water by electrolysis of an electrolytic solution; an acid container for storing the acidic water produced by the electrolytic water producing means; an alkali container for storing the alkaline water produced by the electrolytic water producing means; a mist container connected to the alkali container, the mist container producing a deodorant mist upon receiving a part of the alkaline water in the alkali container; a discharge port selectively connected to the acid container or the alkali container so as to discharge the acidic water from the acid container or the alkaline water from the alkali container; and a mist ejection portion that can spray the deodorant mist in the mist container so that the mist surrounds the acidic water discharged from the discharge port.

The washing apparatus of the invention can utilize the electrolytically-produced acidic water and alkaline water for sterilization, disinfection, and washing. Moreover, during the discharge of the acidic water, the deodorant mist of the alkaline water is sprayed so as to surround the acidic water, thereby preventing the unpleasant chlorine smell of the acidic water. Thus, washing can be carried out comfortably and safely by efficiently using the electrolytically-produced acidic water and alkaline water.

In the washing apparatus of the invention, the mist ejection portion is preferably configured to spray the deodorant mist in conjunction with the discharge of the acidic water from the discharge port.

The method of deodorizing washing water of the present invention is characterized by producing acidic water and alkaline water by electrolysis of an electrolytic solution; and spraying a deodorant mist of the alkaline water when the acidic water is discharged from a discharge port so that the mist surrounds the acidic water discharged from a discharge port.

The method of deodorizing washing water of the invention can suitably be performed by the washing apparatus of the invention. The method of deodorizing washing water of the invention can utilize the electrolytically-produced acidic water and alkaline water for sterilization, disinfection, and washing. Moreover, during the discharge of the acidic water, the alkaline water is sprayed so as to surround the acidic water, thereby preventing the unpleasant chlorine smell of the acidic water. Thus, washing can be carried out comfortably and safely by using the electrolytically-produced acidic water and alkaline water.

In the method of deodorizing washing water of the invention, the deodorant mist is preferably sprayed in conjunction with the discharge of the acidic water from the discharge port.

Advantageous Effects of Invention

According to the present invention, a washing apparatus and a method of deodorizing washing water that can prevent the unpleasant smell of washing water can be provided.

DESCRIPTION OF EMBODIMENTS

The following describes an embodiment of the invention with reference to the drawings.

Figure 1:
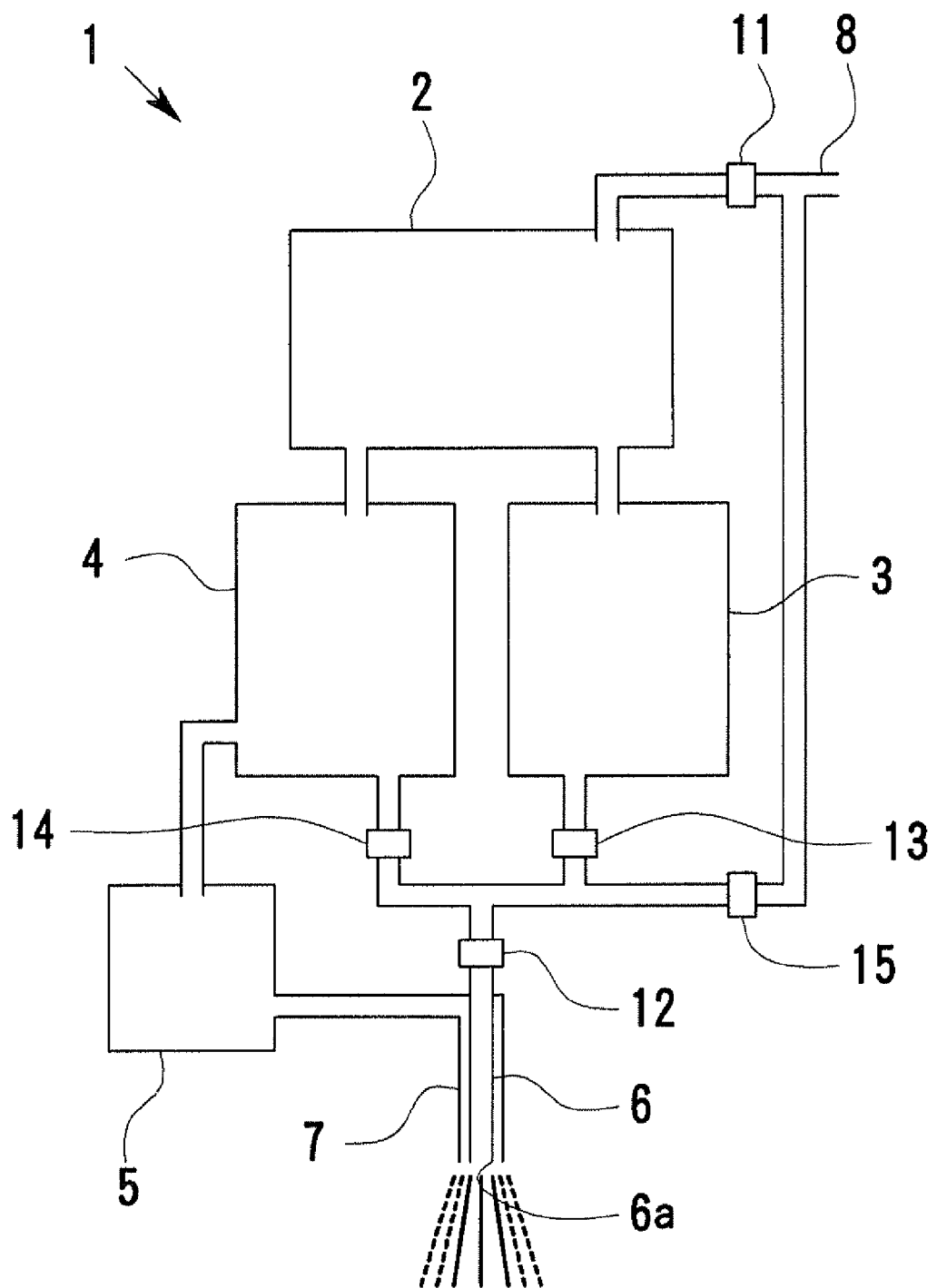
FIG. 1 is a block diagram schematically showing a washing apparatus according to an embodiment of the invention.
Figure 2:
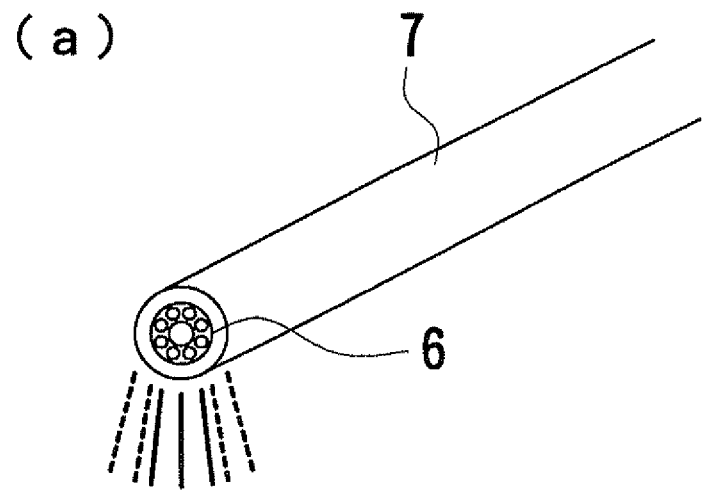
FIG. 2 (a) is a perspective view showing the discharge port and mist ejection portion of the washing apparatus shown in FIG. 1, (b) is a perspective view showing a modification of the mist ejection portion, and (c) is a sectional view showing another modification of the mist ejection portion.
Figure 2:
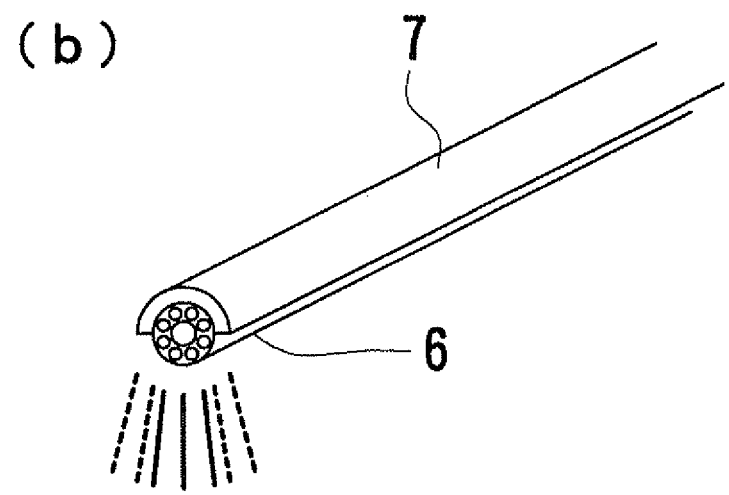
Figure 2:
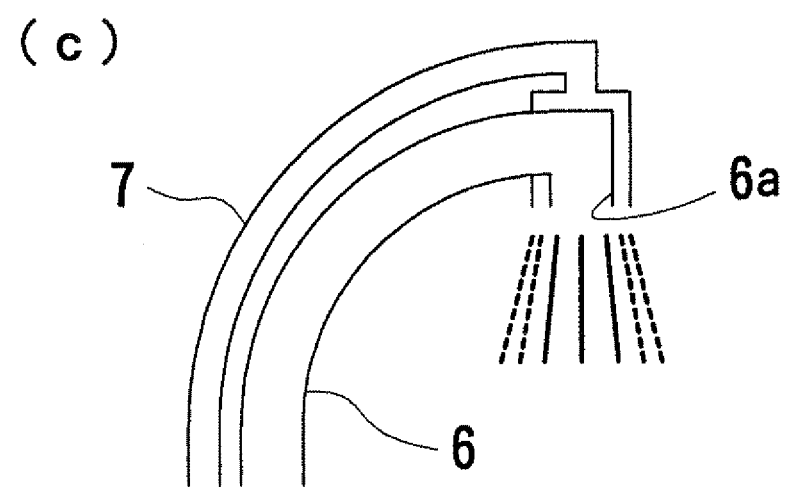

FIGS. 1 and 2 show a washing apparatus and a method of deodorizing washing water according to an embodiment of the invention.

As shown in FIG. 1, a washing apparatus 1 comprises an electrolytic water producing means 2, an acid container 3, an alkali container 4, a mist container 5, a discharge portion 6, and a mist ejection portion 7. The method of deodorizing washing water according to the embodiment of the invention can be conducted by the washing apparatus 1.

As shown in FIG. 1, the electrolytic water producing means 2 comprises an electrolytic cell, which is connected to a water pipe 8 via a cock 11 so that tap water can be supplied to the cell. The electrolytic water producing means 2 is configured to electrolyze an aqueous chloride salt solution prepared by mixing tap water supplied from the water pipe 8 with an electrolyte, such as sodium chloride. The electrolytic water producing means 2 produces strong acidic water on the anode side and strong alkaline water on the cathode side.

The acid container 3 is connected to the anode side of the electrolytic water producing means 2 so as to store the strong acidic water produced by the electrolytic water producing means 2. The alkali container 4 is connected to the cathode side of the electrolytic water producing means 2 so as to store the strong alkaline water produced by the electrolytic water producing means 2. The mist container 5 is connected to the alkali container 4 and is configured to produce a deodorant mist of the strong alkaline water upon receiving a part of the strong alkaline water stored in the alkali container 4.

As shown in FIG. 1 and FIG. 2 (a), the discharge portion 6 is in a tube shape and has a discharge port 6a on the edge. Further, the discharge portion 6 has an on-off cock 12. The discharge portion 6 is connected to the acid container 3, the alkali container 4, and the water pipe 8 respectively via valves 13, 14, and 15. The discharge portion 6 is selectively connected to the acid container 3, the alkali container 4, or the water pipe 8 by the operation of each of the valves 13, 14, and 15, so that the strong acidic water in the acid container 3, the strong alkaline water in the alkali container 4, or tap water can be discharged from the discharge port 6a. Each of the valves 13, 14, and 15 may be manually operated or may be automatically operated by means of buttons etc. to select the type of water to be used. Alternatively, each of the valves may be automatically switched at predetermined times by computer programming, etc.

The mist ejection portion 7 is in a double tube shape and is connected to the mist container 5. The discharge portion 6 is inserted into the mist ejection portion 7, which is attached to cover the outer surface of the discharge portion 6. The mist ejection portion 7 is configured to spray the deodorant mist of the strong alkaline water in the mist container 5 by means of a motor or other driving source in conjunction with the movement of the cock 12 of the discharge portion 6 or the movement of each of the valves 13, 14, and 15. When the strong acidic water or tap water is discharged from the discharge port 6a, the mist ejection portion 7 sprays the deodorant mist of the strong alkaline water around the strong acidic water or tap water so that the mist surrounds the strong acidic water or tap water.

Instead of being connected to the mist container 5, the mist ejection portion 7 may be directly connected to the alkali container 4 so as to spray the deodorant mist of the strong alkaline water upon receiving a part of the strong alkaline water stored in the alkali container 4.

Subsequently, the functions are described.

The washing apparatus 1 can carry out sterilization, disinfection, and washing using the strong acidic water and strong alkaline water electrolytically produced by the electrolytic water producing means 2. For example, first, a material to be washed (e.g., hands, a medical appliance, or the like) is washed with the strong alkaline water. Thereby, proteins, lipids, etc., in the blood, which are coagulated by acid, can be decomposed. After washing with the strong alkaline water, the material to be washed is washed with the strong acidic water for sterilization. Sterilization, disinfection, and washing can effectively be carried out in this manner. For a higher washing effect, washing with tap water may be performed before or after washing with the strong alkaline water or strong acidic water.

The washing apparatus 1 can prevent the smell of chlorine contained in the strong acidic water or tap water by spraying the deodorant mist of the strong alkaline water from the mist ejection portion 7 around of the strong acidic water or tap water discharged from the discharge port 6a so that the mist surrounds the strong acidic water or tap water. Moreover, in case of generation of toxic chlorine gas from tap water or the strong acidic water, the chlorine gas can be dissolved in the strong alkaline water. High safety is thus ensured.

Since the mist ejection portion 7 is configured to spray the deodorant mist of the strong alkaline water in conjunction with the discharge of the strong acidic water or tap water, the smell of the strong acidic water or tap water can efficiently be prevented without wastefully spraying the deodorant mist of the strong alkaline water. Thus, the washing apparatus 1 can conduct washing comfortably and safely by efficiently using the electrolytically-produced strong acidic water and strong alkaline water.

As shown in FIG. 2 (b), the mist ejection portion 7 may be formed to cover a part of the periphery of the discharge portion 6, instead of covering the entire periphery of the outer surface of the discharge portion 6, so that the deodorant mist is sprayed from the mist ejection portion 7 so as to separate a user from the discharge portion 6. Alternatively, the mist ejection portion 7 may cover only the outer edge of the discharge port 6a, as shown in FIG. 2 (c). In this case, the deodorant mist can block from a user the smell of the strong acidic water or tap water discharged from the discharge port 6a, thereby preventing the smell of chlorine.

REFERENCE SIGNS LIST

1: Washing apparatus
2: Electrolytic water producing means
3: Acid container
4: Alkali container
5: Mist container
6: Discharge portion
6a: Discharge port
7: Mist ejection portion
8: Water pipe
11, 13, 14, and 15: Valves
12: Cock

The invention claimed is:

1. A washing apparatus comprising:
   an electrolytic water producing means that produces acidic water and alkaline water by electrolysis of an electrolytic solution;
   an acid container for storing the acidic water produced by the electrolytic water producing means;
   an alkali container for storing the alkaline water produced by the electrolytic water producing means;
   a mist container connected to the alkali container, the mist container producing a deodorant mist upon receiving a part of the alkaline water in the alkali container;
   a discharge port selectively connected to the acid container or the alkali container so as to discharge the acidic water from the acid container or the alkaline water from the alkali container; and
   a mist ejection portion that can spray the deodorant mist in the mist container so that the mist surrounds the acidic water discharged from the discharge port.

2. The washing apparatus according to claim 1, wherein the mist ejection portion is configured to spray the deodorant mist in conjunction with the discharge of the acidic water from the discharge port.

3. A method of deodorizing washing water, comprising:
   producing acidic water and alkaline water by electrolysis of an electrolytic solution; and
   spraying a deodorant mist of the alkaline water so that the mist surrounds the acidic water discharged from a discharge port.

4. The method of deodorizing washing water according to claim 3, wherein the deodorant mist is sprayed in conjunction with the discharge of the acidic water from the discharge port.

\* \* \* \* \*